V. G. APPLE.
DYNAMO ELECTRIC MACHINE.
APPLICATION FILED FEB. 14, 1918.
1,396,947.
Patented Nov. 15, 1921.
2 SHEETS—SHEET 2.
Fig. 2.
Fig. 3.
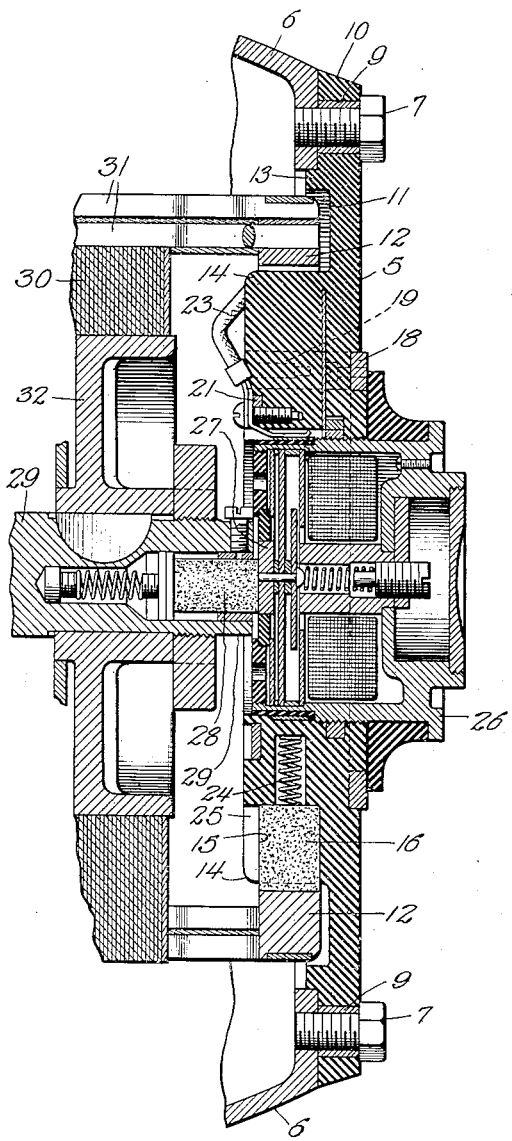
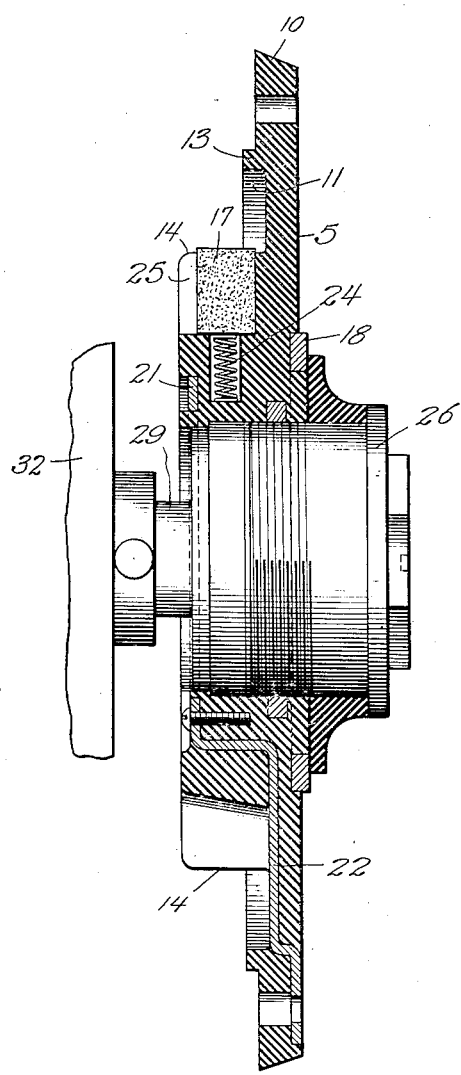
Witnesses:
J. N. Daggett
Loretta M. Gibbons
Inventor:
Vincent G. Apple
Foree Bain Hook
Attys.

UNITED STATES PATENT OFFICE.

VINCENT G. APPLE, OF DAYTON, OHIO.

DYNAMO-ELECTRIC MACHINE.

1,396,947.  Specification of Letters Patent.  Patented Nov. 15, 1921.

Original application filed April 23, 1917, Serial No. 163,803. Divided and this application filed February 14, 1918. Serial No. 217,150.

*To all whom it may concern:*

Be it known that I, VINCENT G. APPLE, a citizen of the United States, residing at Dayton, in the county of Montgomery and State of Ohio, have invented certain new and useful Improvements in Dynamo-Electric Machines, of which the following is a specification.

My invention relates to improvements in dynamo electric machines.

One of the objects of my invention is to provide an improved end plate for a dynamo electric machine, which may serve as a brush holder for the collecting brushes that bear upon the commutator and may provide means for supporting a current governor or regulator which coöperates with a moving part of the machine, such as the rotating shaft of the armature.

I preferably make the end plate of a strong insulating material, such as bakelite or similar substance, and mold it with the necessary conducting parts embedded therein, together with any other metal parts that may be necessary to give it the desired strength.

I provide means whereby the end plate, which carries the commutator brushes may be rotatably adjusted to secure the brushes at proper points for sparkless commutation.

In the exemplified embodiment, the shaft of the armature does not project beyond the end plate and the end of the shaft is utilized for moving an eccentrically rotatable contact for coöperation with the current regulator, which is removably supported in the end plate.

Other and further objects of my invention will become readily apparent to persons skilled in the art from a consideration of the following description when taken in conjunction with the drawings, wherein:—

Fig. 2 is a central axial section taken on line 2—2 of Fig. 1, showing the means for attaching the end plate to the dynamo electric machine field frame.

Fig. 3 is a section taken on line 3—3 of Fig. 1.

In all the views the same reference characters indicate similar parts.

Figure 1:
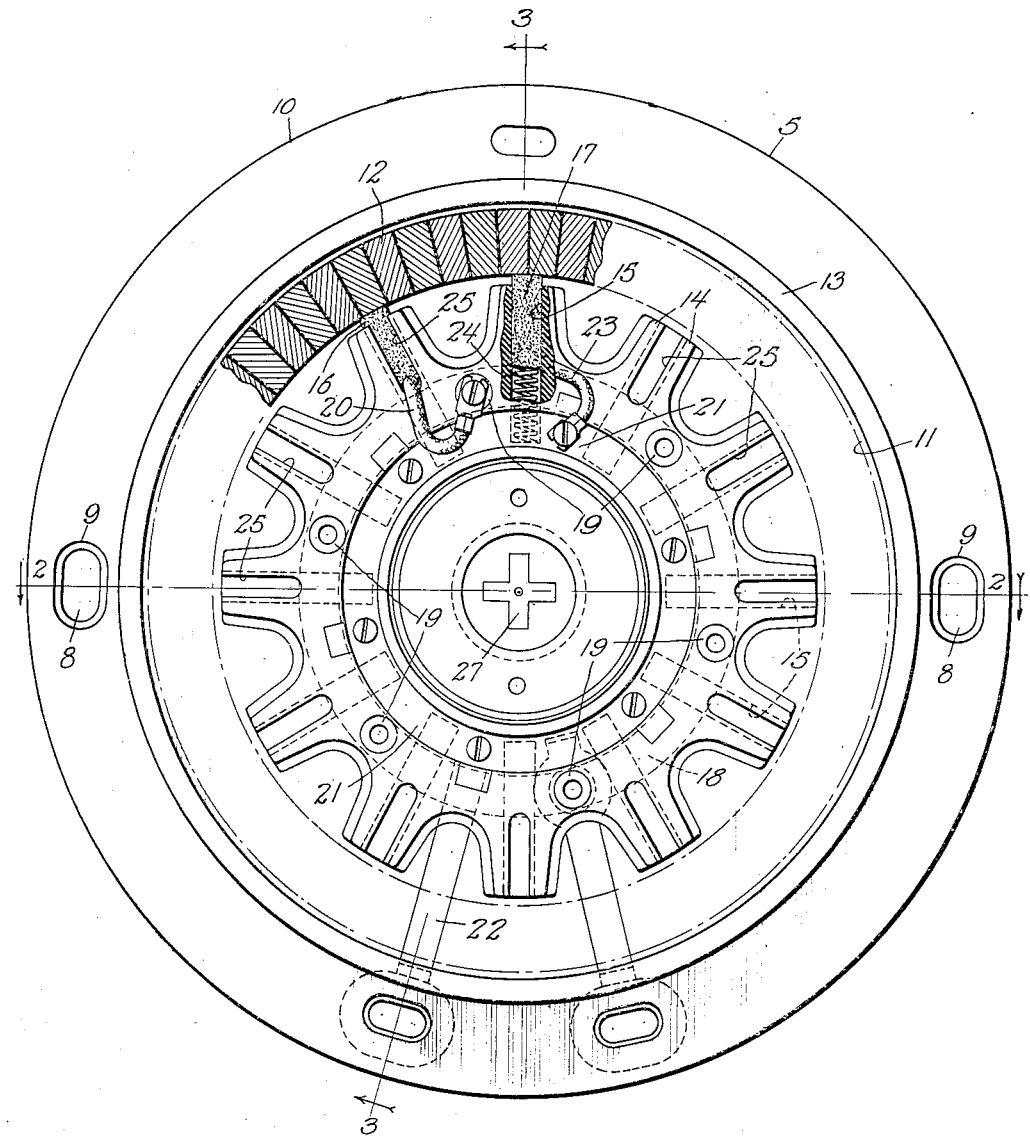
Figure 1 is a transverse section taken through part of the commutator of Fig. 2, looking at the inside surface of the end plate.

The end plate, or disk of insulating material 5 is secured to the field magnet frame 6 by cap screws 7. The holes 8—8 through which the cap screws pass are circumferentially elongated and are bushed by metal linings 9, to strengthen the rim 10 of the plate to withstand the crushing effect of the screws 7—7. These holes are elongated, like the other holes contained in the rim, through which screws pass into the frame 6, to permit some rotary adjustment of the brush-carrying plate 5 for a purpose heretofore explained.

The plate contains an annular groove 11 into which the end of the commutator 12 projects. This space is provided between the rim 13 and the outer ends 14 of the walls that partly surround the radially extending groove 15, in which the commutating brushes 16 and 17 are contained.

There are six brushes of the 16 group and six of the 17 group. The brushes of each group are contained in alternate grooves.

Partly embedded in the plate 5 is an annularly disposed ring 18, on the outside surface of the plate and projecting inwardly from the ring are six studs 19. To these studs the brushes of the 16 group are connected, as by a pig tail 20. Another ring 21 is a part of the bar 22, embedded in the plate, and to this ring the six brushes of group 17 are connected, as by a pig tail 23. One set of brushes are positive and the other set are negative, and they all bear upon the inner surface of the commutator 12.

Each of the brush grooves has an annular extension to contain a spring 24 that yieldingly holds the respective brush in contact with the commutator. The brush-holding grooves are also flanked by a narrow opening 25, through which the pig tail connecting cables may move as the brush is worn and fed outwardly by the yielding spring placed under each of the brushes.

In the present example the plate 5 is axially perforated to receive the current regulator which has an axially movable contact 27 that coöperates with a rotatable contact 28 that is eccentrically positioned in the armature shaft 29.

On the core 30 of the armature are mounted the conductors 31 that are connected to the commutator 12, which projects into a radial plane in which part of the end plate 10 is located. The core is supported on the shaft by the spider 32.

This application is divided out from my copending application Serial No. 163,803, filed April 23rd, 1917.

While I have herein shown a single embodiment of my invention, it is manifest that changes therein may be made in the arrangement and configuration of the parts within the scope of the appended claims.

Having described my invention, what I claim is:—

1. In a dynamo electric machine, an end plate, of insulating material, having a plurality of circumferentially disposed guideways for the commutator brushes carried on its inside surface.

2. In a dynamo electric machine an end plate of moldable, insulating material having a plurality of circumferentially disposed guideways for the commutator brushes molded therein.

3. An end plate, for a dynamo electric machine, of insulating, movable material having a plurality of circumferentially disposed guideways for the commutator brushes molded therein and conductors to which the brushes are to be connected, molded in said plate.

4. An end plate, for a dynamo electric machine, of insulating moldable material having a plurality of circumferentially disposed guideways for the commutator brushes molded therein and having a spring holding cavity within which to contain a spring to hold the respective brush in contact with a commutator.

5. An end plate, for a dynamo electric machine, of insulating movable material having radially disposed guideways for commutator brushes molded therein and an annular groove confronting the open ends of the guideways within which to receive the end of a commutator.

6. An end plate, for a dynamo electric machine, of insulating moldable material, having an axial perforation and having a series of circumferentially disposed grooves or guideways, between said perforation and the periphery of the plate.

7. An end plate for a dynamo electric machine, of insulating, moldable material having radially disposed guideways for commutator brushes molded therein and having circumferentially elongated perforations near its periphery, to contain attaching screws, and to permit circumferential adjustment of the plate.

8. A dynamo electric machine having an end plate of insulating material and a commutator projecting into a plane including a part of the plate.

9. A dynamo electric machine having an end plate of insulating material and a plurality of receptacles in which to hold the guide commutator brushes.

10. A dynamo electric machine having an end plate of insulating material with radially disposed grooves in its inner face.

11. A dynamo electric machine having an end plate of insulating material with a series of openings or grooves in its inner face and a commutator facing the terminals of the openings.

12. An end plate of insulating material, for a dynamo electric machine, thicker near its hub than at its periphery and having grooves for conducting brushes in the thicker part of the plate.

13. An end plate of insulating material for a dynamo electric machine, extending across one end thereof and having a series of radially converging grooves for containing conducting brushes therein.

14. An end plate of insulating material, for a dynamo electric machine, extending across one end thereof and fixed near its periphery to a stationary part of the machine and having a plurality of radially converging grooves for conducting brushes therein.

In testimony whereof I hereunto set my hand.

VINCENT G. APPLE.

CERTIFICATE OF CORRECTION.

Patent No. 1,396,947.      Granted November 15, 1921, to

VINCENT G. APPLE.

It is hereby certified that error appears in the printed specification of the above numbered patent requiring correction as follows: Page 2, lines 25 and 40, claim 3 and 5 respectively, for "movable" read "moldable"; and that the said Letters Patent should be read with this correction therein that the same may conform to the record of the case in the Patent Office.

Signed and sealed this 14th day of January, A. D. 1930.

(Seal)

M. J. Moore,
Acting Commissioner of Patents.